United States Patent
Kim et al.

(10) Patent No.: US 8,036,432 B2
(45) Date of Patent: Oct. 11, 2011

(54) SYSTEM AND METHOD OF SAVING DIGITAL CONTENT CLASSIFIED BY PERSON-BASED CLUSTERING

(75) Inventors: Yong-Sung Kim, Suwon-si (KR); Duck-Hoon Kim, Seongnam-si (KR); Hee-Seon Park, Seoul (KR); Hye-Soo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 920 days.

(21) Appl. No.: 12/025,109

(22) Filed: Feb. 4, 2008

(65) Prior Publication Data

US 2009/0028393 A1    Jan. 29, 2009

Related U.S. Application Data

(60) Provisional application No. 60/951,568, filed on Jul. 24, 2007.

(30) Foreign Application Priority Data

Oct. 24, 2007 (KR) .......................... 10-2007-107427

(51) Int. Cl.
*G06K 9/00* (2006.01)

(52) U.S. Cl. ........................................ 382/118; 382/225

(58) Field of Classification Search ................ 358/3.17; 382/118, 225; 702/737, E17.046, E17.047, 702/E17.089, E17.091, E17.092
See application file for complete search history.

(56) References Cited

U.S. PATENT DOCUMENTS

| | | | | |
|---|---|---|---|---|
| 5,774,576 A * | 6/1998 | Cox et al. | ...... | 382/160 |
| 7,085,783 B1 | 8/2006 | Ito | | |
| 7,152,097 B1 * | 12/2006 | Allmark | ...... | 709/219 |
| 7,187,786 B2 | 3/2007 | Kee | | |
| 7,551,755 B1 * | 6/2009 | Steinberg et al. | ...... | 382/118 |
| 2003/0210808 A1 * | 11/2003 | Chen et al. | ...... | 382/118 |

FOREIGN PATENT DOCUMENTS

| | | |
|---|---|---|
| JP | 2004-305560 | 11/2004 |
| JP | 2006-92214 | 4/2006 |
| JP | 2006-243849 | 9/2006 |
| JP | 2006-323621 | 11/2006 |
| KR | 1998-024383 | 7/1998 |
| KR | 2004-39788 | 5/2004 |
| KR | 2005-13467 | 2/2005 |
| KR | 2006-8814 | 1/2006 |
| KR | 2007-47063 | 5/2007 |

* cited by examiner

*Primary Examiner* — Gregory F Cunningham
(74) *Attorney, Agent, or Firm* — NSIP Law, PC

(57) ABSTRACT

A system and method of saving digital content classified by person-based clustering. The system for saving digital content classified by person-based clustering, includes a database to save a plurality of digital content classified by person-based clustering; a data structure generation unit to generate a data structure composed of a plurality of nodes using the plurality of digital content; a face recognition unit to extract a face descriptor of new digital content to be saved in the database; a cluster classification unit to classify the new digital content and the plurality of digital content by the person-based clustering using the extracted face descriptor, and a data structure update unit to update the data structure according to the classification.

35 Claims, 17 Drawing Sheets

SYSTEM AND METHOD OF SAVING DIGITAL CONTENT CLASSIFIED BY PERSON-BASED CLUSTERING

CROSS-REFERENCE TO RELATED APPLICATIONS

This application claims the benefit of U.S. Provisional Application No. 60/951,568 filed in the United States Patent and Trademark Office on Jul. 24, 2007 and Korean Patent Application No. 2007-107427 filed in the Korean Intellectual Property Office on Oct. 24, 2007, the disclosures of which are incorporated herein by reference.

BACKGROUND OF THE INVENTION

1. Field of the Invention

Aspects of the present invention relate to a system and method of saving digital content classified by person-based clustering, and more particularly, to a system and method of classifying digital content by person-based clustering and saving the classified content in a database.

2. Description of the Related Art

Recently, as use of mass digital storage devices, such as HDD, flash memory, and so forth, has spread, the amount of digital content that can be stored in such digital storage devices has been increasing geometrically. In addition, with the activation of P2P (Peer-to-Peer), online shopping, UCC (User Created Content), and so forth, many kinds of digital content have been produced, which can be managed by multimedia devices that can manage digital content, such as digital cameras, MP3 players, digital TVs, PVRs (Personal Video Recorders), PMPs (Portable Multimedia Player), and so forth.

Accordingly, there is an increasing demand to browse or retrieve content in diverse forms, and diverse retrieving techniques have been used for such content browsing. However, as the use of high-integrated and subminiature memories has been generalized due to the development of memory technology, and digital image compression technology that does not greatly damage the picture quality has been developed, a large amount of digital content can be stored in multimedia devices, and thus a system and method for effectively managing the stored digital content is required.

Users have a tendency to classify and arrange digital content by times, persons, or specified categories. Such classified digital content can be browsed by a user or easily shared with another user. However, it takes a lot of time and effort in grouping or labeling a large amount of digital content one by one, and another user must reclassify the digital content even after the content has been classified by the original user.

As described above, with the increasing demand to browse or retrieve content in diverse forms, person information included in the content may be used as a primary tool in browsing or retrieving content. For example, photos may be classified into user's own photos, photos of the user's wife, photos of the user's son, photos of the user's parents, photos of the user's friend, and so forth, and videos may be classified according to the appearance of characters in various scenes.

Accordingly, there is a need for a system and method for classifying digital content by person-based clustering and efficiently saving the classified content in a database. In addition, there is a need for a system and method for automatically classifying digital content by person-based clustering and saving the classified content in a database even where the digital content is added or deleted.

SUMMARY OF THE INVENTION

Aspects of the present invention provide a system and method of saving digital content classified by person-based clustering when an addition or deletion of the digital content is performed.

Additional aspects of the present invention provide a system and method of classifying digital content by person-based clustering and efficiently saving the classified digital content in a database by introducing flags through a cluster grouping when an addition or deletion of the digital content is performed.

Additional advantages, objects, and features of the invention will be set forth in part in the description which follows and in part will become apparent to those having ordinary skill in the art upon examination of the following or may be learned from practice of the invention.

According to an aspect of the invention, a system for saving digital content classified by person-based clustering is provided. The system includes a database to save a plurality of digital content classified by person-based clustering; a data structure generation unit to generate a data structure including a plurality of nodes using the plurality of digital content; a face recognition unit to extract a face descriptor of new digital content to be saved in the database; a cluster classification unit to classify the new digital content and the plurality of digital content by the person-based clustering using the extracted face descriptor; and a data structure update unit to update the data structure according to the classification.

According to another aspect of the present invention, a system for saving digital content classified by person-based clustering is provided. The system includes a data structure generation unit to generate a data structure including a plurality of nodes using a plurality of digital content; a cluster classification unit to classify the remaining digital content by the person-based clustering using a face descriptor if a part of the plurality of digital content is deleted; a data structure update unit to update the data structure according to the classification; and a database to update and save the remaining digital content by reflecting the updated data structure.

According to another aspect of the present invention, a method of saving digital content classified by person-based clustering is provided. The method includes generating a data structure including a plurality of nodes using a schema of a database that stores a plurality of digital content; extracting a face descriptor of new digital content to be saved in the database; classifying the new digital content and the plurality of digital content by the person-based clustering using the extracted face descriptor; and updating the data structure according to the classification.

According to another aspect of the present invention, there is provided a method of saving digital content classified by person-based clustering, which includes generating a data structure including a plurality of nodes using a plurality of digital content; classifying the remaining digital content by the person-based clustering using a face descriptor if a part of the plurality of digital content is deleted; updating the data structure according to the classification; and updating and saving the remaining digital content in a database by reflecting the updated data structure.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
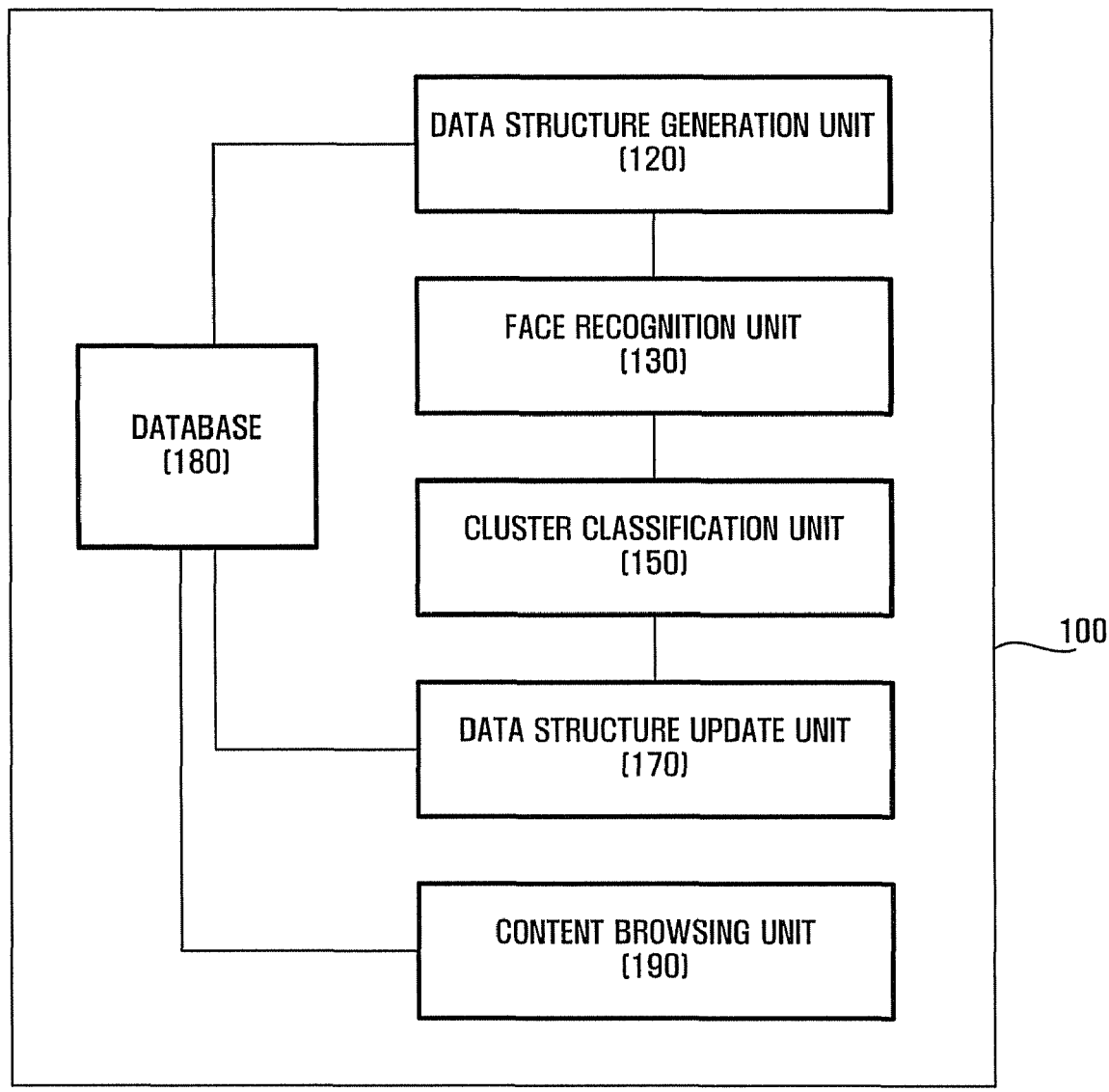
FIG. 1 is a block diagram illustrating a system for saving digital content classified by person-based clustering according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention will be described herein with reference to the accompanying drawings illustrating block diagrams and flowcharts for explaining a system and method of saving digital content classified by person-based clustering according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus operations to implement the functions specified in the flowchart block or blocks.

Each block of the flowchart illustrations may represent a module, segment, or portion of code, which comprises one or more executable instructions to implement the specified logical function(s). In some alternative implementations, the functions noted in the blocks may occur out of order. For example, two blocks shown in succession may in fact be executed substantially concurrently or the blocks may sometimes be executed in reverse order, depending upon the functionality involved.

According to aspects of the present invention, the term "unit", as used herein, may be implemented as a kind of module. The term "module" refers to, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 2:
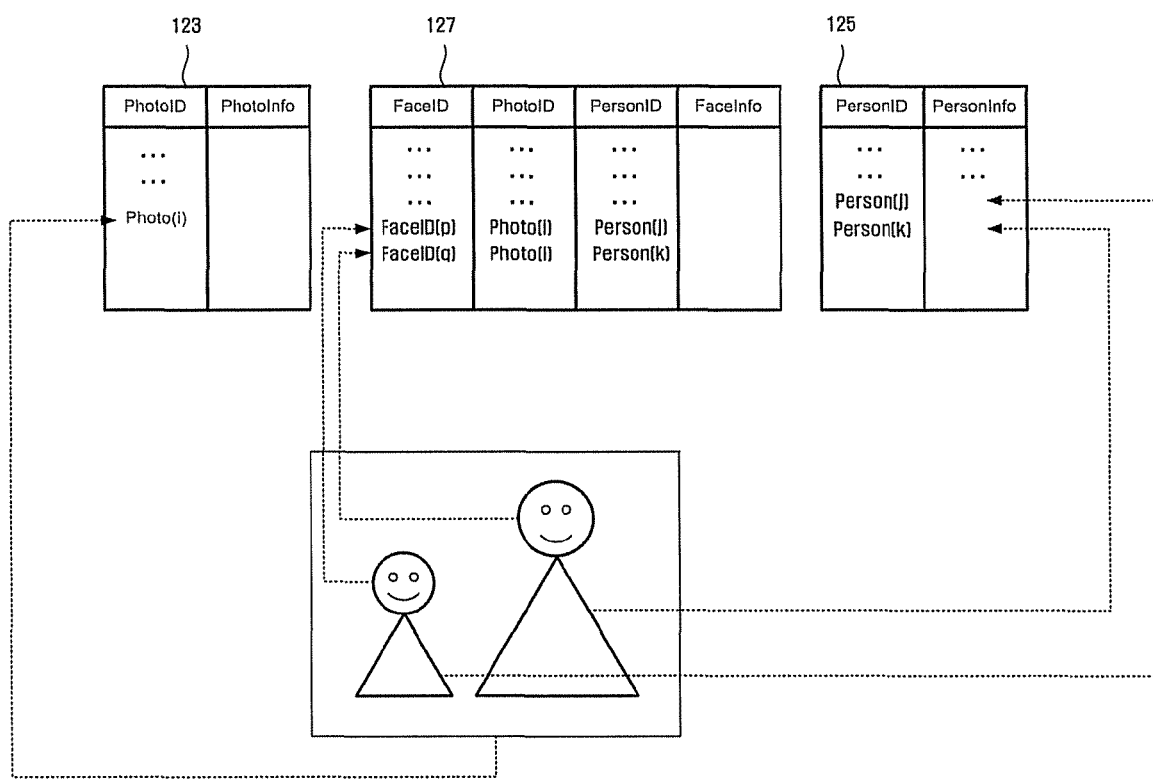
FIG. 2 is a view illustrating a database schema in a system for saving digital content classified by person-based clustering according to an embodiment of the present invention.
Figure 3:
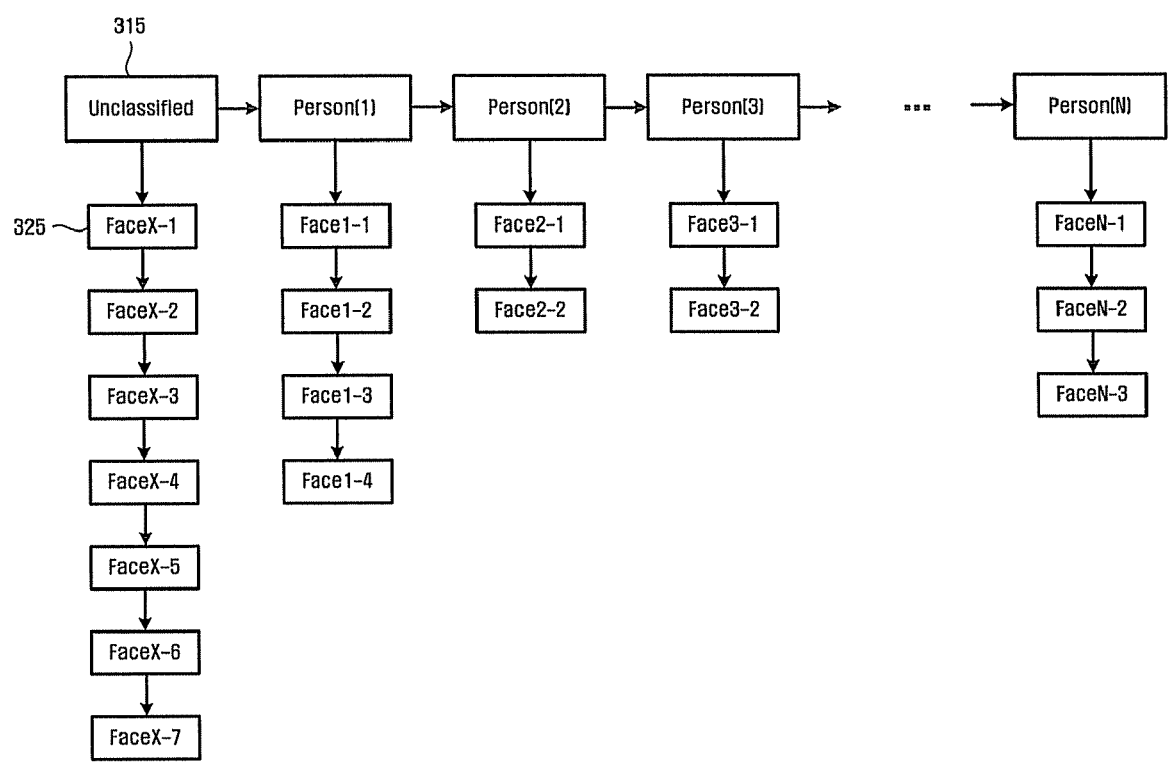
FIG. 3 is an exemplary view illustrating a data structure in a system for saving digital content classified by person-based clustering according to an embodiment of the present invention.
Figure 4:
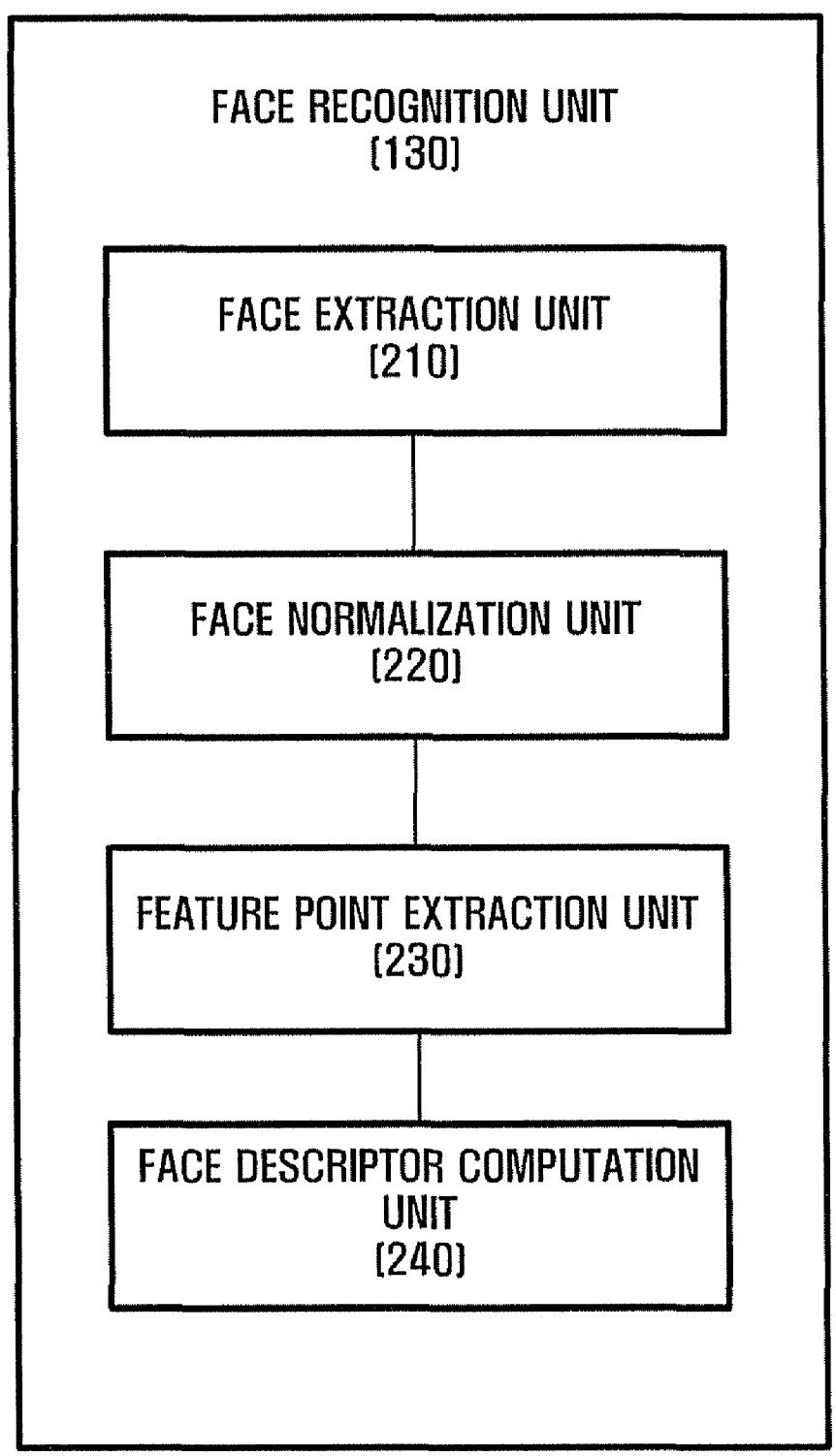
FIG. 4 is a block diagram illustrating the construction of a face recognition unit in a system for saving digital content classified by person-based clustering according to an embodiment of the present invention.
Figure 5:
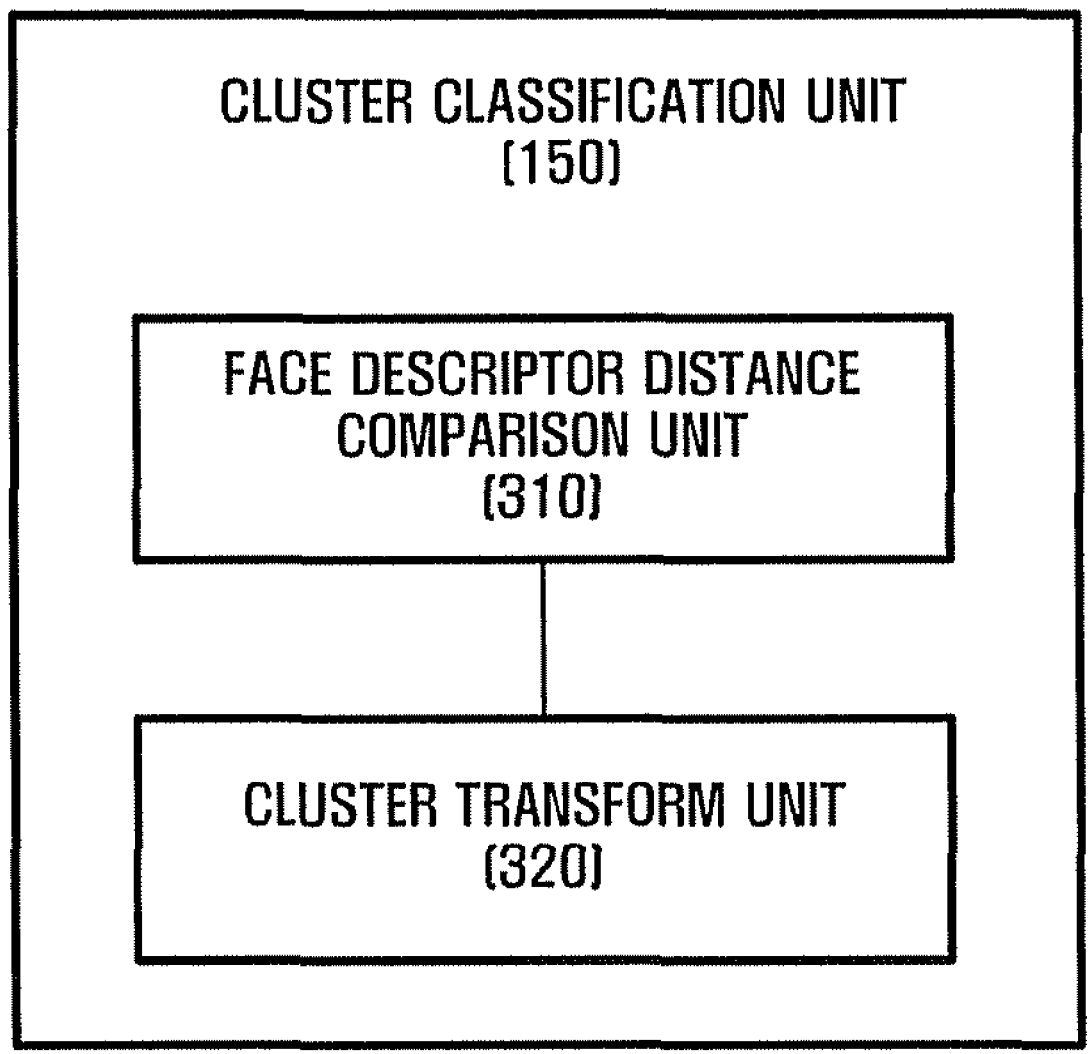
FIG. 5 is a block diagram illustrating the construction of a cluster classification unit in a system for saving digital content classified by person-based clustering according to an embodiment of the present invention.

FIG. 1 shows a system 100 for saving digital content classified by person-based clustering according to an embodiment of the present invention. FIG. 2 shows a database schema in the system 100, according to an embodiment of the present invention. FIG. 3 shows a data structure in the system 100, according to an embodiment of the present invention. FIG. 4 shows a face recognition unit 130 in the system 100, according to an embodiment of the present invention. FIG. 5 shows a cluster classification unit 150 in the system 100, according to an embodiment of the present invention. As shown in FIG. 1, the system 100 includes a data structure generation unit 120, the face recognition unit 130, the cluster classification unit 150, a data structure update unit 170, a database 180, and a content browsing unit 190.

The content browsing unit 190 shows information about a plurality of digital content classified by person-based clustering, which are saved in the database 180, so that a user can see the digital content. The user can browse the saved digital content by person-based clustering while the user views the digital content information on a display (not shown).

The database 180 saves a plurality of digital content. Digital content indicates content that includes a person's images, such as photos, moving images, and so forth. The database 180 can save the digital content classified by person-based clustering. For example, the digital content may include photos. In order to save photos by person-based clustering, a schema as shown in FIG. 2 may be applied. Although described herein with respect to photos and faces, aspects of the present invention may also be applied to other types of content that may or may not include faces, such as motion pictures, movies, or text.

The schema, which may be applied to save photos classified by person-based clustering, may include a photo information table 123 for saving the photo, a person information table 125 for saving person information, and a face information table 127 for saving face information. The photo information table 123 saves a photo identifier PhotoID as a primary key for properly classifying the content, and also saves content-related information, such as a file name of the content. The person information table 125 saves a person identifier PersonID as a primary key for properly classifying the person, and also saves person-related information, such as a name of the person. The face information table 127, which is a table for saving characters, content, and parts of the content in which the characters appear, saves a face identifier FaceID as a primary key for properly classifying respective faces, primary keys of the photo information table and the person information table as foreign keys in order to classify the persons and the content in which the faces appear, and face-related information, such as locations of the content where the faces appear. In each face identifier FaceID, a face descriptor may be included as a quantitative value of the corresponding face. The schema may be applied in order to save the content classified by person-based clustering in the database. A similar schema may be used to classify motion picture content, as motion picture content can be seen as a series of still images.

Referring again to FIG. 1, the data structure generation unit 120 generates a data structure using a plurality of digital content provided from the database. The data structure generation unit 120 can generate the data structure classified by person-based clustering through the use of the schema.

As shown in FIG. 3, a data structure classified by person-based clustering is shown with respect to the plurality of digital content saved in the database by the data structure generation unit 120. For example, when using a data structure of a two-dimensional (2D) linked list, person nodes 315 are generated and linked by person-based clustering, and face nodes 325 classified as the corresponding person are generated and linked to the respective person node. The data structure generation unit 120 generates the linked list using the schema of the database classified by person-based clustering.

Referring again to FIG. 1, the face recognition unit 130 recognizes a face in an image of newly input digital content. The face recognition unit 130 recognizes a person in the image included in the new digital content and extracts a face extractor to classify the content by person-based clustering from the recognized person. General face recognition techniques may be divided into a technique of pre-registering a reference face and matching a given face to the most similar reference face, and a clustering technique for grouping similar faces when a reference face is not registered.

According to one embodiment of the present invention, the digital content may be classified by persons through a cluster grouping that is estimated as the same person by a clustering technique. Face recognition techniques are described in detail in Korean Unexamined Patent Publication Nos. 2005-0013467, 2006-0008814, and 2007-0047063. Other face recognition and clustering techniques may be employed as well.

Referring to FIG. 4, the face recognition unit 130 includes a face extraction unit 210, a face normalization unit 220, a feature point extraction unit 230, and a face descriptor computation unit 240. The face extraction unit 210 extracts a face region by extracting a face and constituent element of the face from an image included in the digital content. The face extraction unit 210 detects a rough face from the image, extracts eyes, a nose, a mouth, and so forth, which are specified constituent elements of the face, and then extracts the face region based on the extracted face constituent elements. For example, a process of cutting the face region from the input image based on the distance between the two eyes, as a pre-process for face recognition, can minimize the influence of the background of the image, the change of the hair style of the person, and so forth.

The face normalization unit 220 normalizes the size of the face region using the extracted face region information. By normalizing the size of the face region, specified personal appearance of the face region, such as the distance between two eyes, the distance between an eye and a nose, and so forth, can be maintained.

The feature point extraction unit 230 extracts feature points, such as eyes, from the normalized face region. The feature points may be selected as points on the face region that enlarge the difference between images of different input faces, through experiments for a plurality of persons. For example, when applying a Gabor filter to the selected feature points, the feature points that improve the face recognition capability may be selected by making results of filter application with respect to the face images differ clearly.

The face descriptor computation unit 240 computes a face descriptor using the extracted feature points. The face descriptor can be computed by selecting and using PCA (Principal Component Analysis), LDA (Linear Discriminant Analysis), and so forth, adopted by the MPEG-7 standard. The face descriptor is a measured value for the face extracted from the image included in the digital content through the use of the extracted feature points, for example, a feature vector, a feature matrix, and so forth. The computation of the face descriptor is described in detail in Korean Unexamined Patent Publication Nos. 2005-0013467, 2006-0008814, and 2007-0047063 as described above. The face descriptor may also be computed by a general technique of recognizing a face through extraction of the feature points from the face image, or by other techniques.

As shown in FIG. 5, the cluster classification unit 150 classifies the digital content by persons through a cluster grouping. The cluster classification unit 150 includes a face descriptor distance comparison unit 310 and a cluster transform unit 320.

The face descriptor distance comparison unit 310 compares the distances between face descriptors of faces computed by the face recognition unit 130. For example, when representing the face descriptor in the form of a feature vector or a feature matrix, the face descriptor, such as the feature vector or the feature matrix, of an image included in the digital content previously saved in the database can be computed through the same process. Accordingly, if the faces are recognized to be similar to each other, the distance between the feature vectors or feature matrices, which are represented in space or dimensions, becomes below the threshold value. The face descriptor distance comparison unit 310 computes the distance between the face descriptors and determines whether the distance is below the threshold value. The threshold value corresponds to the maximum value of the distance differences between the face descriptors computed from the face images which are determined to correspond to the same person, and can be selected through an analysis or simulation process.

The cluster transform unit 320 classifies the digital content by clusters using the distance information of the face descriptors. The classification by clusters is performed in a manner that the face image having the face descriptor in a specified range is determined as the same cluster, i.e., the same person.

FIGS. 6 to 9 show examples of cluster grouping performed by a cluster transform unit in a system for saving digital content classified by person-based clustering according to an embodiment of the present invention. The term "cluster grouping" refers to a process of generating, extending, or combining the clusters that represent the range where the face images are judged to correspond to the same person.

Figure 6:
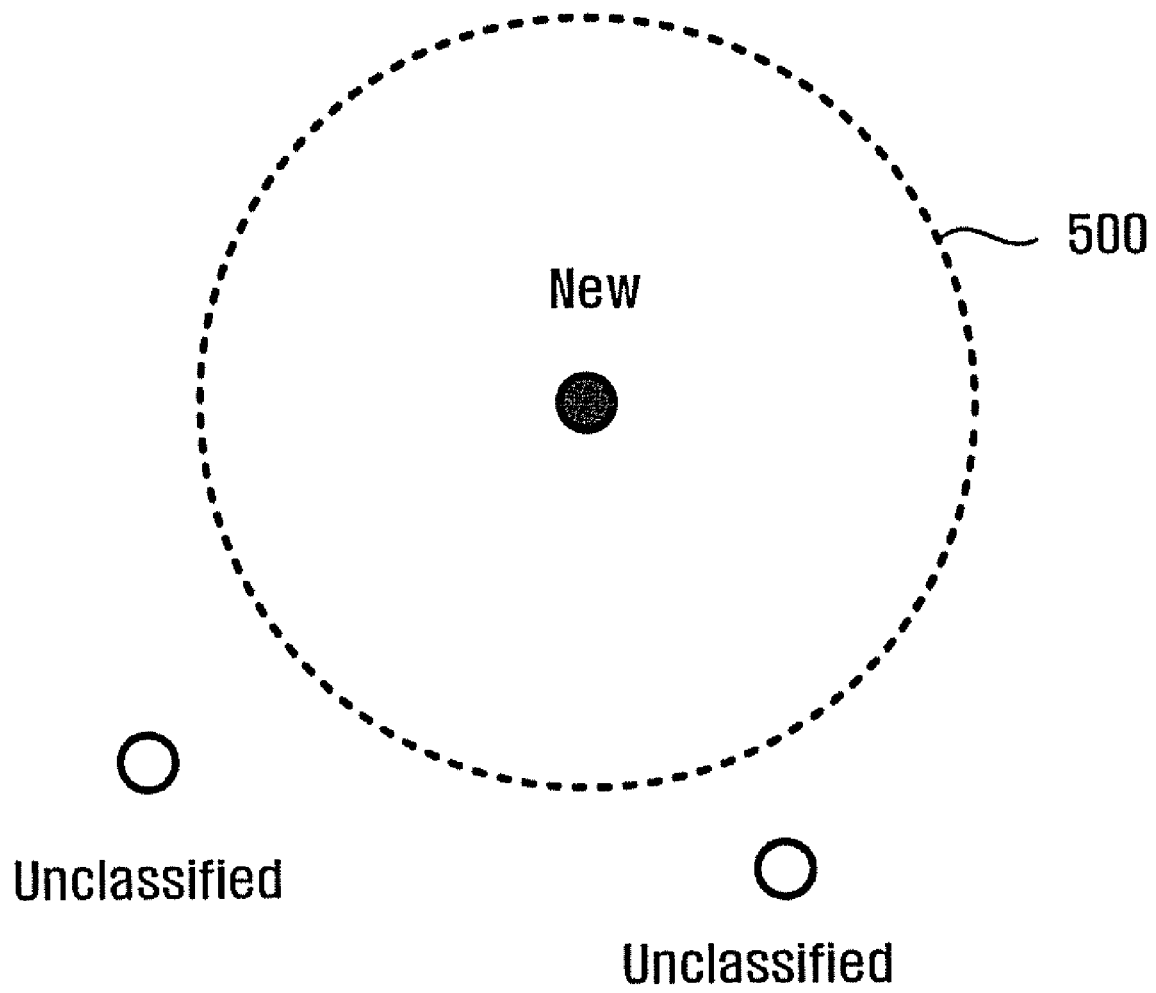
FIGS. 6 to 9 are views illustrating examples of cluster grouping performed by a cluster transform unit in a system for saving digital content classified by person-based clustering according to an embodiment of the present invention.

In the example shown in FIG. 6, a new face is added to a collection of previously registered faces. The faces may be considered as points in a vector space. If the distance between the points is smaller than a threshold value, the new face can be considered to correspond to the same person. If no previously registered face exists within the threshold distance of the newly added face, as shown in FIG. 6, the newly registered face remains in an unclassified state.

Figure 7:
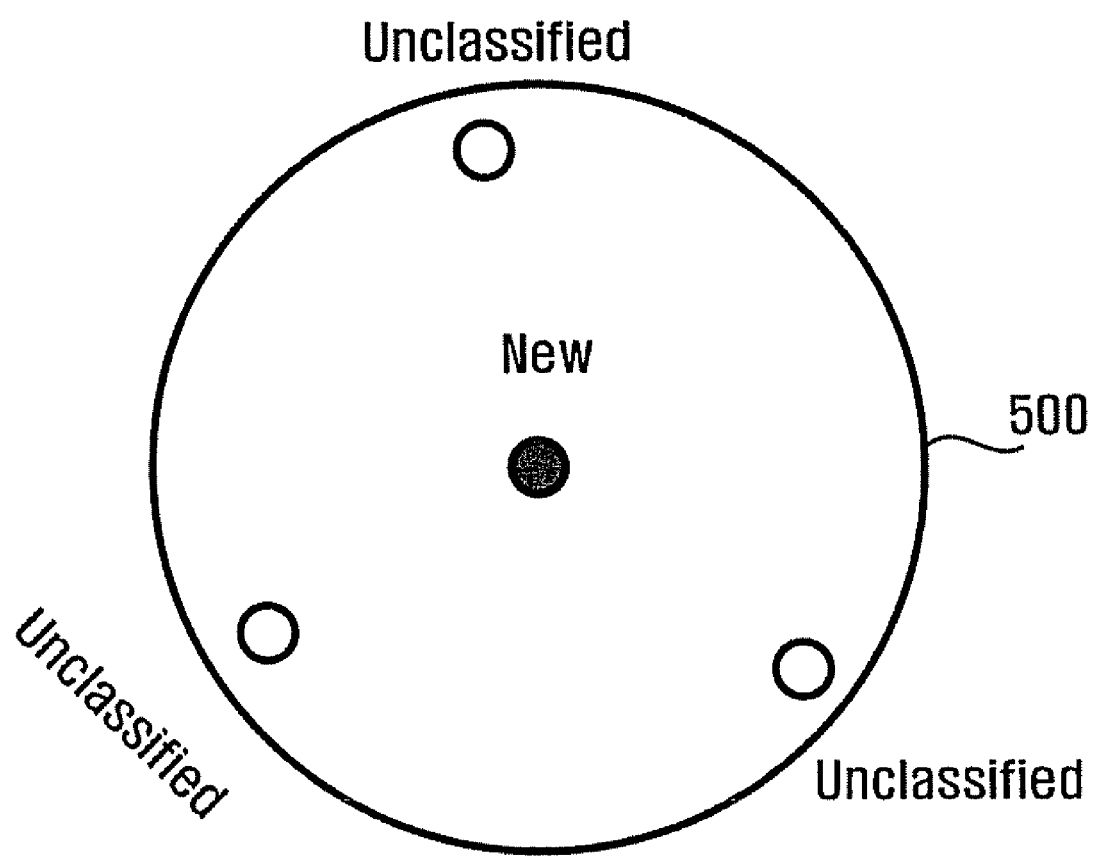

As shown in FIG. 7, if the distance between the face descriptor of the face included in the newly added digital content and the face descriptor previously registered as an unclassified face is within the threshold distance, then a new cluster 500 is generated. Due to the generation of the new cluster, the face previously registered as an unclassified face and the face included in the newly added digital content are estimated to correspond to the same person, and thus the digital content is classified accordingly. In this case, the face of the newly added content may have correlation information with the newly generated cluster, and the faces previously registered as unclassified faces may be updated to be correlated with the newly generated cluster.

In the example shown in FIG. 8, the distance between the face descriptor of the face of the newly added digital content and the face descriptor of the neighboring person (i) classified as an unclassified or specified person may be below the threshold value. In this case, the face of the newly added digital content, as well as the faces of other unclassified digital content, may be classified as the same person as the person (i) to extend the cluster 500.

Figure 9:
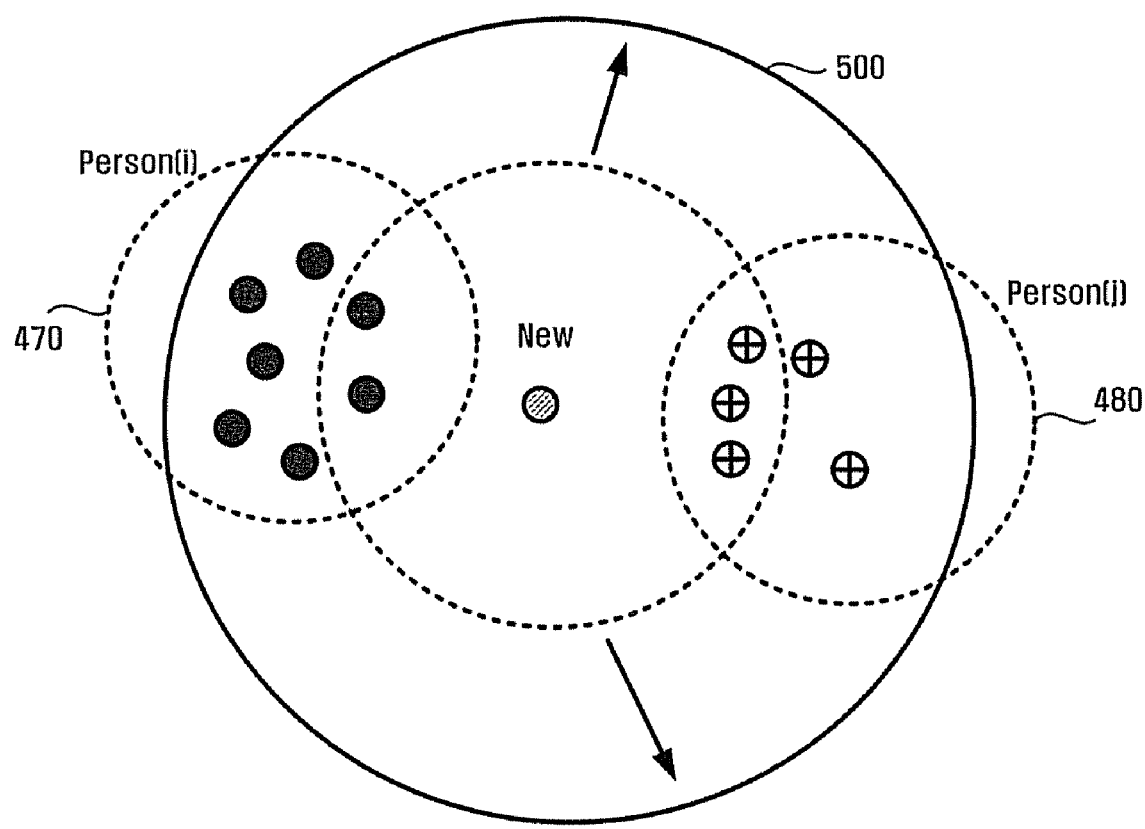

In the example shown in FIG. 9, a recognized face of new digital content is located between a person (i) and a person (j) classified as different persons in two clusters 470 and 480 for the person (i) and the person (j), respectively. If the distance between a distance descriptor of the recognized face of the new digital content and a distance descriptor of the person (i) or the person (j) is below the threshold value, the person (i), the person (j), and the recognized face of the new digital content are classified as the same person. By inputting the recognized face of the new digital content, the existing clusters are combined to extend the cluster 500.

As described above, the cluster classification unit 150 can generate, extend, and combine the cluster 500 through cluster grouping. The face of the newly added digital content and the face previously saved in the database can be classified by person through the cluster grouping that is performed by the cluster classification unit 150. In addition, the cluster grouping can be applied in the case of adding and deleting the digital content. When deleting the digital content, the cluster grouping can be performed in an opposite manner to that as shown in FIGS. 6 to 9.

Figure 10:
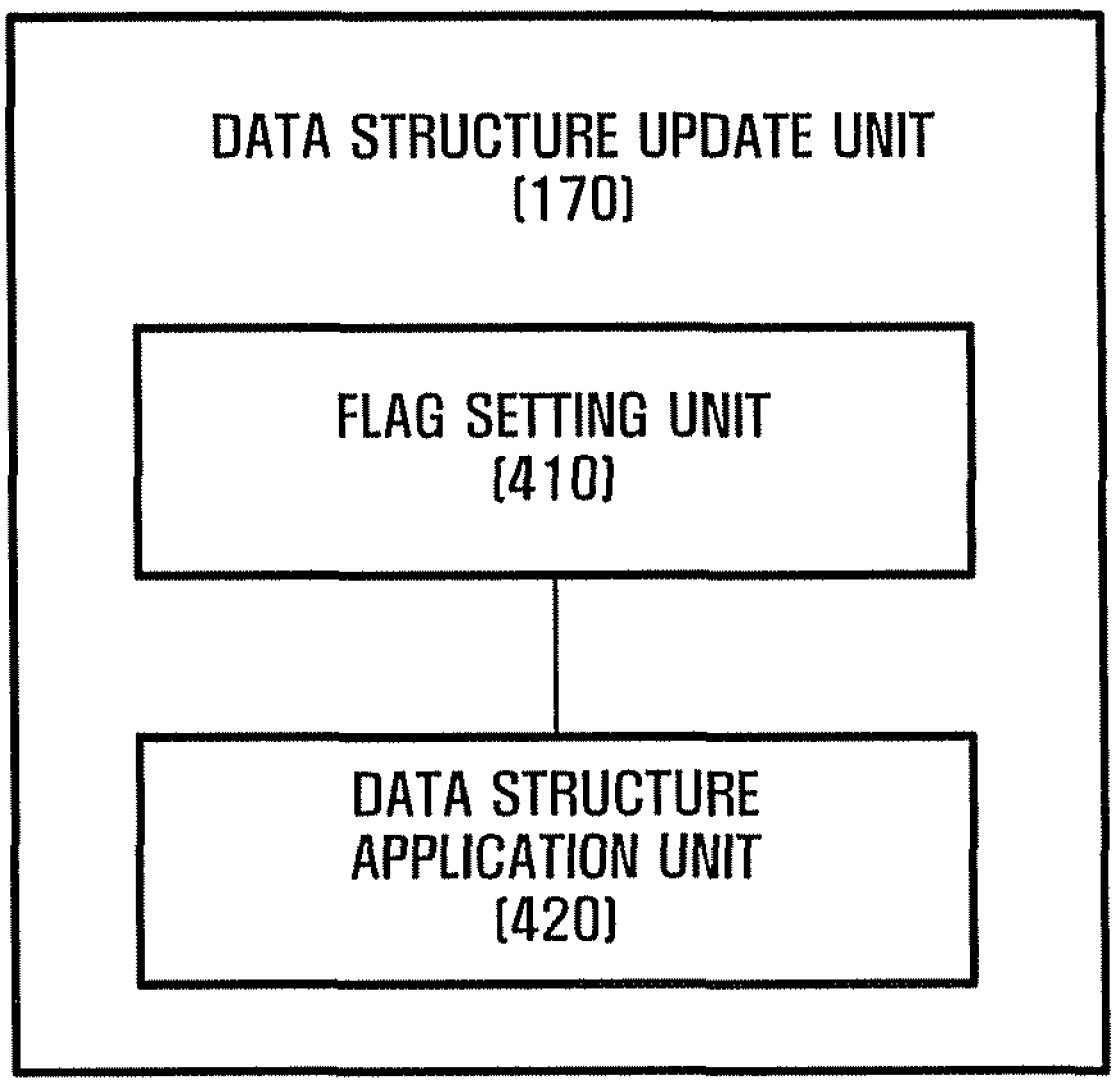
FIG. 10 is a block diagram illustrating the construction of a data structure update unit in a system for saving digital content classified by person-based clustering according to an embodiment of the present invention.

FIG. 10 shows the data structure update unit 170 in the system 100, according to an embodiment of the present invention. The data structure update unit 170 updates the data structure of the digital content classified by person through the cluster classification unit 150. The data structure update unit 170 introduces flags to apply the cluster transform, such as cluster generation, deletion, or combination, which is performed by the cluster classification unit 150, to the data structure. The data structure update unit 170 includes a flag setting unit 410 and a data structure application unit 420.

The flag setting unit 410 sets flags of nodes that arrange the digital content. The flags are information that reflect the change of the nodes generated according to the cluster grouping by persons classified by the cluster classification unit 150. The flag setting unit 410 may save the flags in a separate storage device or temporarily in a memory. The data structure application unit 420 automatically updates the data structure according to the set flag.

Figure 11:
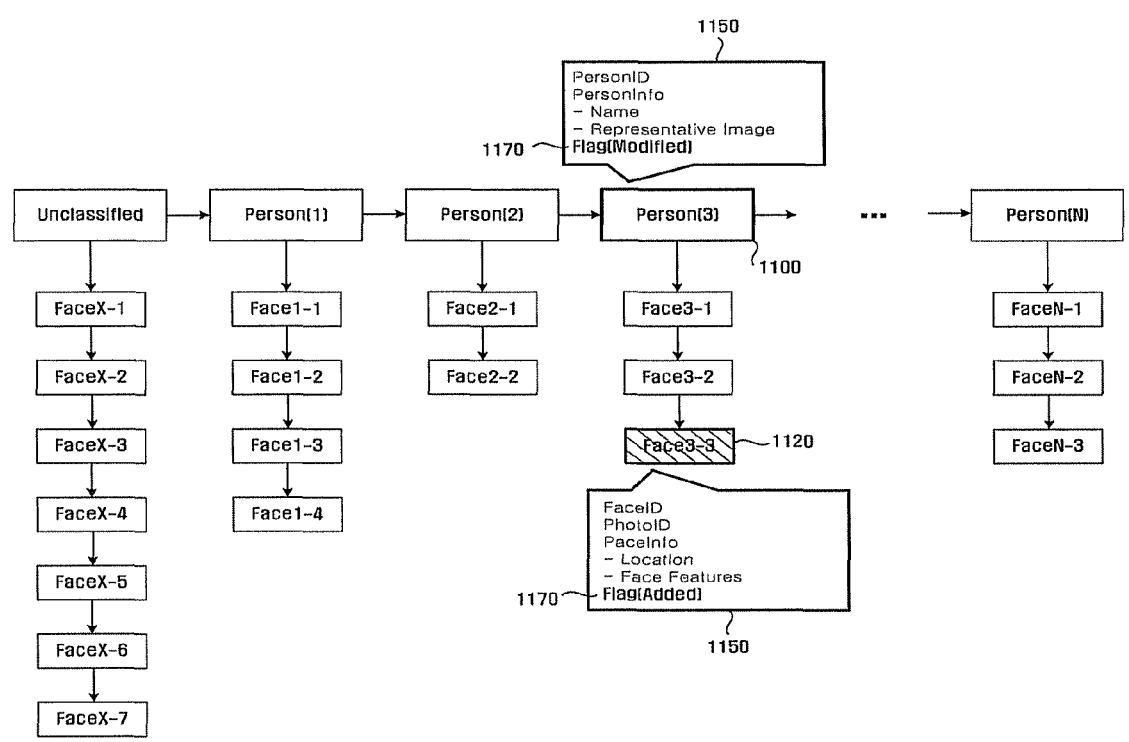
FIG. 11 is a view explaining flag setting performed by a flag setting unit in a system for saving digital content classified by person-based clustering according to an embodiment of the present invention.

FIG. 11 shows flag setting performed by the flag setting unit 410 in the system 100, according to an embodiment of the present invention. FIGS. 12 to 15 show processes of updating a data structure performed by a data structure application unit in the system 100, according to an embodiment of the present invention.

For example, the digital content may include photos and have a data structure classified by persons as shown in FIG. 3. The flag may be set to "Modified", "Added", or "None", and diverse flags may be used by a designer or a user. All nodes may have an initial state where the flag is set to "None".

As shown in FIG. 11, if the "Face3-3" that is a new photo to be saved in the database is judged to correspond to "Person3" by the face recognition unit 130 and the cluster classification unit 150, the "Face3-3" node 1120 is added to the "Person3" node 1100. Accordingly, the flag 1170 in the "Person3" node 1100 is set to "Modified", and the flag 1170 in the "Face3-3" node 1120 is set to "Added". The respective node may include an information table 1150 for saving correlation information. The flag 1170 may be saved in the information table 1150 or a separate storage device.

Figure 12:
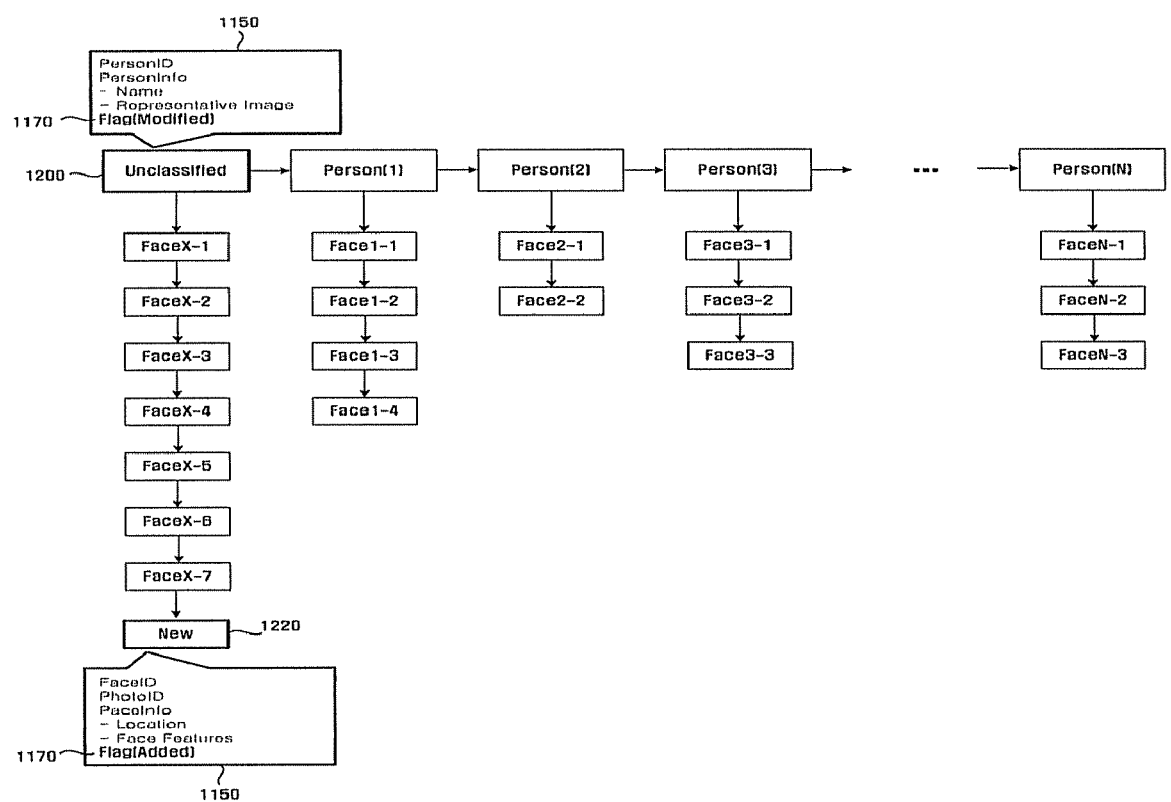
FIGS. 12 to 15 are views explaining processes of updating a data structure performed by a data structure application unit in a system for saving digital content classified by person-based clustering according to an embodiment of the present invention.

FIG. 12 shows the addition of a new "Face" node 1220. If a new face is added as shown in FIG. 6, but is not judged to be a specified person, the new face may be added to the "Face" node 1220 that is a lower node of the "Unclassified" node 1200. Accordingly, the flag setting unit 410 sets the flag 1170 in the "Unclassified" node 1200 to "Modified", and the flag in the "Face" node 1220 to "Added". The data structure application unit 420 updates the data structure according to the set flag 1170 as illustrated in FIG. 12.

Figure 13:
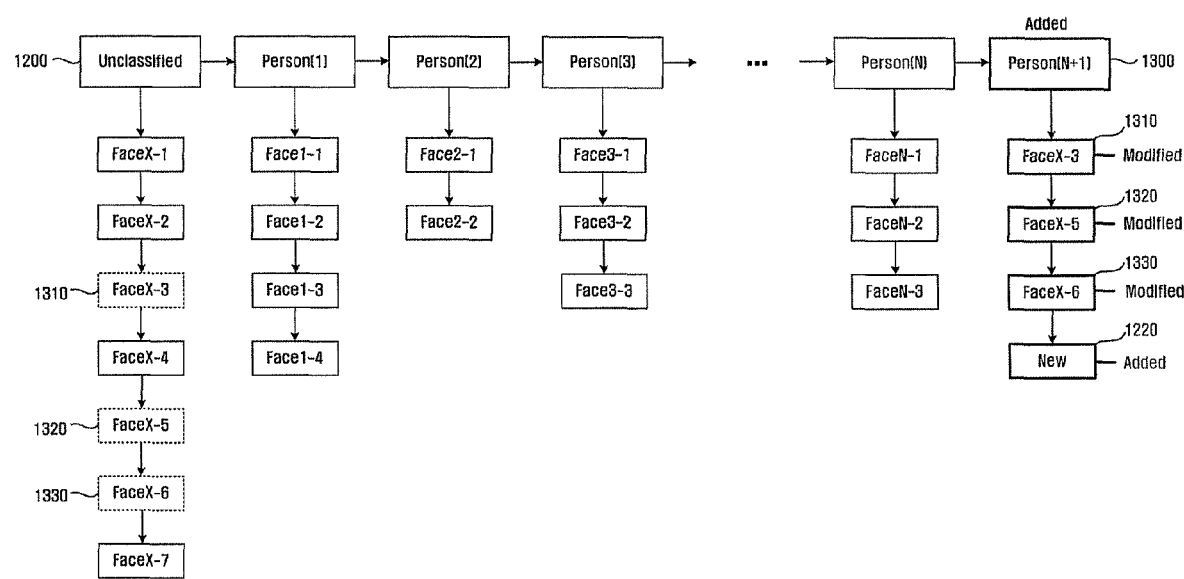

FIG. 13 shows the generation of the new cluster 500 and the addition of a new "Person" node 1300 is added as shown in FIG. 7. As the new cluster 500 is generated, the "Face" nodes 1310, 1320, 1330, and 1220, which are classified as the same person, are arranged in the new "Person" node 1300. Accordingly, the flag setting unit 410 sets the flag in "Person" node 1300 to "Added", the flags in the "Person" nodes 1310, 1320, and 1330 that are lower nodes of the existing "Unclassified" node 1200 to "Modified", and the flag in the new "Face" node 1220 to "Added", respectively. The data structure setting unit 420 adds the "Face" nodes 1310, 1320, and 1330 to the new "Person" node 1300 as the data structure setting unit 420 deletes the "Face" nodes 1310, 1320, and 1330 from the "Unclassified" node 1200, according to the set flag. Accordingly, the flag setting according to the generation of the new cluster 500 and the update of the data structure through the data structure application unit 420 can be performed. Boxes in FIG. 13 indicated by dotted lines refer to boxes that are moved to other locations with the deletion of the nodes.

Figure 8:
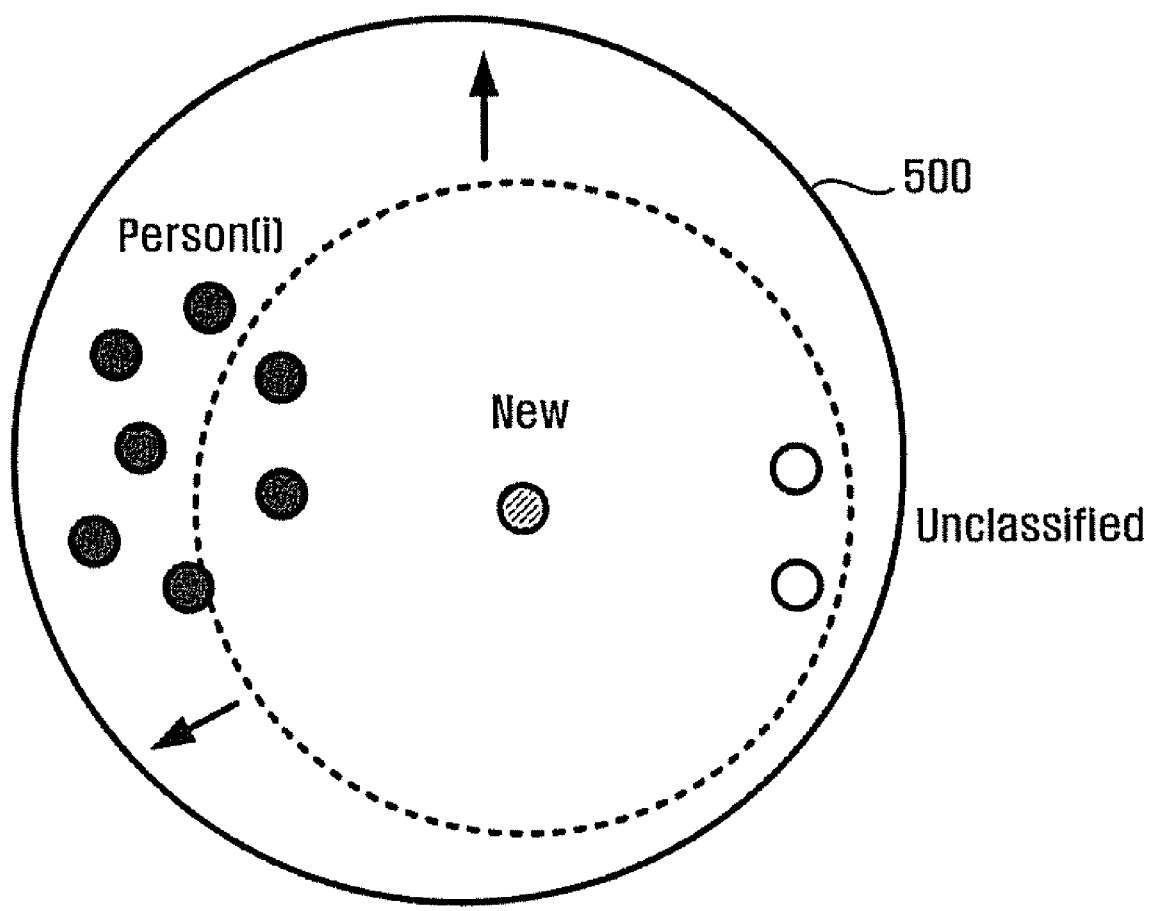
Figure 14:
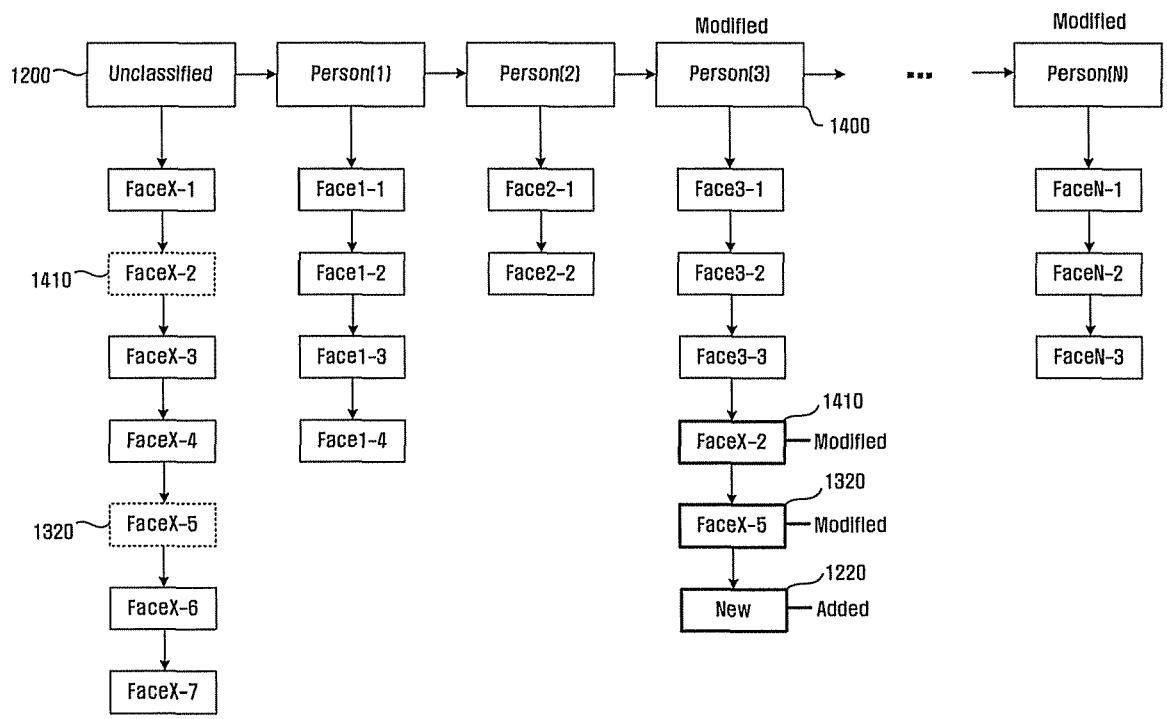

FIG. 14 shows the flag setting and the update of the data structure performed in the event that the cluster is extended as shown in FIG. 8. As a new photo is added, faces of other photos that remain unclassified are classified as the same person. The "Face" nodes 1410 and 1320 of the "Unclassified" node 1200 are modified into lower nodes 1410 and 1320 of the "Person3" node 1400, and the "Face" node 1220 of a new photo is added to the "Person3" node 1400. The flag of the "Person3" node 1400 is set to "Modified", the flags of the "Face" nodes 1410 and 1320 that are lower nodes of the "Person3" node 1400 are set to "Modified", and the flag of the new "Face" node 1220 is set to "Added". The data structure can be updated according to the set flag. Boxes in FIG. 14 indicated by dotted lines refer to boxes that are moved to other locations with the deletion of the nodes.

Figure 15:
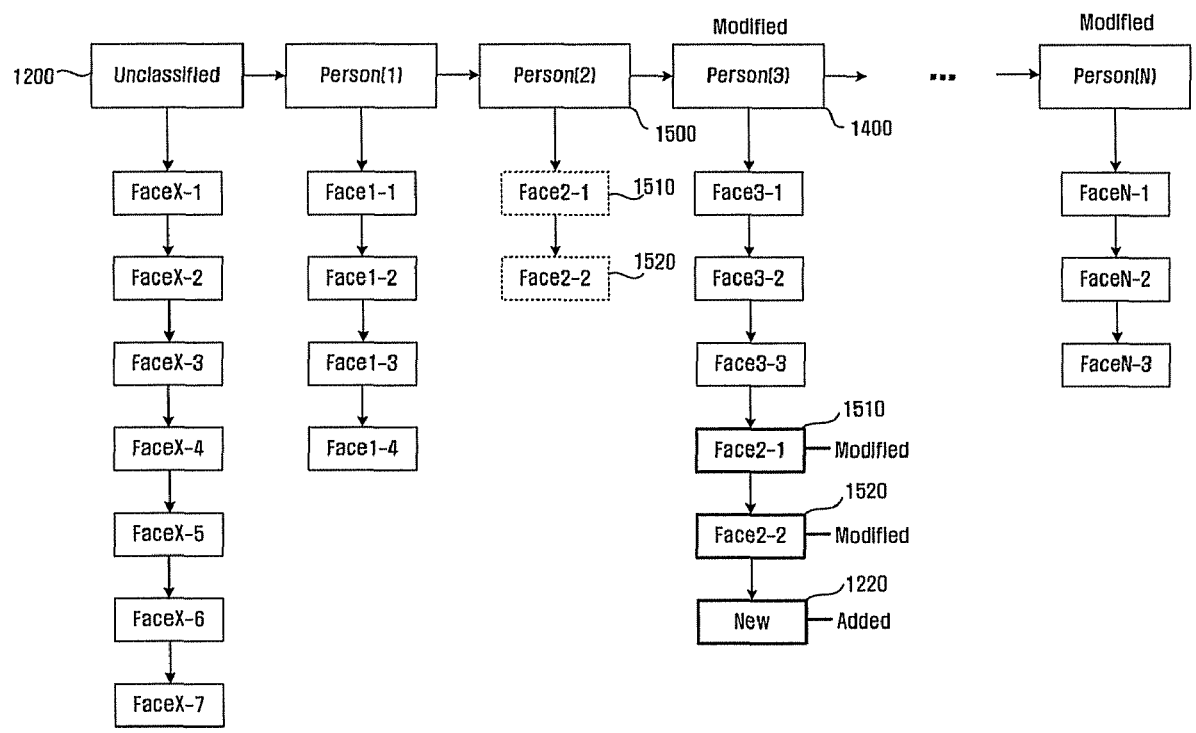

FIG. 15 shows the flag setting and the update of the data structure being performed in the event that the clusters are combined as shown in FIG. 9. In this case, as a new photo is added, two persons judged as different persons are combined due to the addition of the new face. For example, if "Person2" and "Person3" are determined to be the same person, two face nodes 1510 and 1520 linked to the "Person2" node 1500 are linked to the "Person3" node 1400. In addition, the new "Face" node 1220 of the new photo is also added to the "Person3" node 1400.

The flag setting unit 410 sets the flags of the "Person3" node 1400 and "Face" nodes 1510 and 1520 to "Modified" according to the cluster combination, and sets the flag of the new "Face" node 1220 to "Added". The data structure can be updated according to the set flag. Boxes indicated by dotted lines refer to boxes that are moved to other locations with the deletion of the nodes.

As described above, the face recognition unit 130 extracts a face descriptor from new content inputted thereto, and the cluster classification unit 150 classifies the digital content by persons through the cluster grouping. The data structure of the digital content classified by person-based clustering can be efficiently updated through the flag setting of the classified digital content. By updating only the changed part of the data structure and saving the updated part of the data structure in the database, the details of the change according to the cluster grouping can be efficiently reflected in the database.

The flag is described as set in the node. However, according to other aspects of the present invention, the set flags may also be saved in the face and person information tables or in a predefined storage device.

As described above, in an embodiment of the present invention, a plurality of digital content is classified by person-based clustering, and thus a user can easily retrieve and browse the digital content. By variably classifying the digital content by persons through the generation, extension, or combination of the clusters, the classification of the digital content can be performed even without a reference image. In addition, even if digital content is newly added or deleted by the flag setting, such addition or deletion of the digital content can be efficiently reflected in the database.

Figure 16:
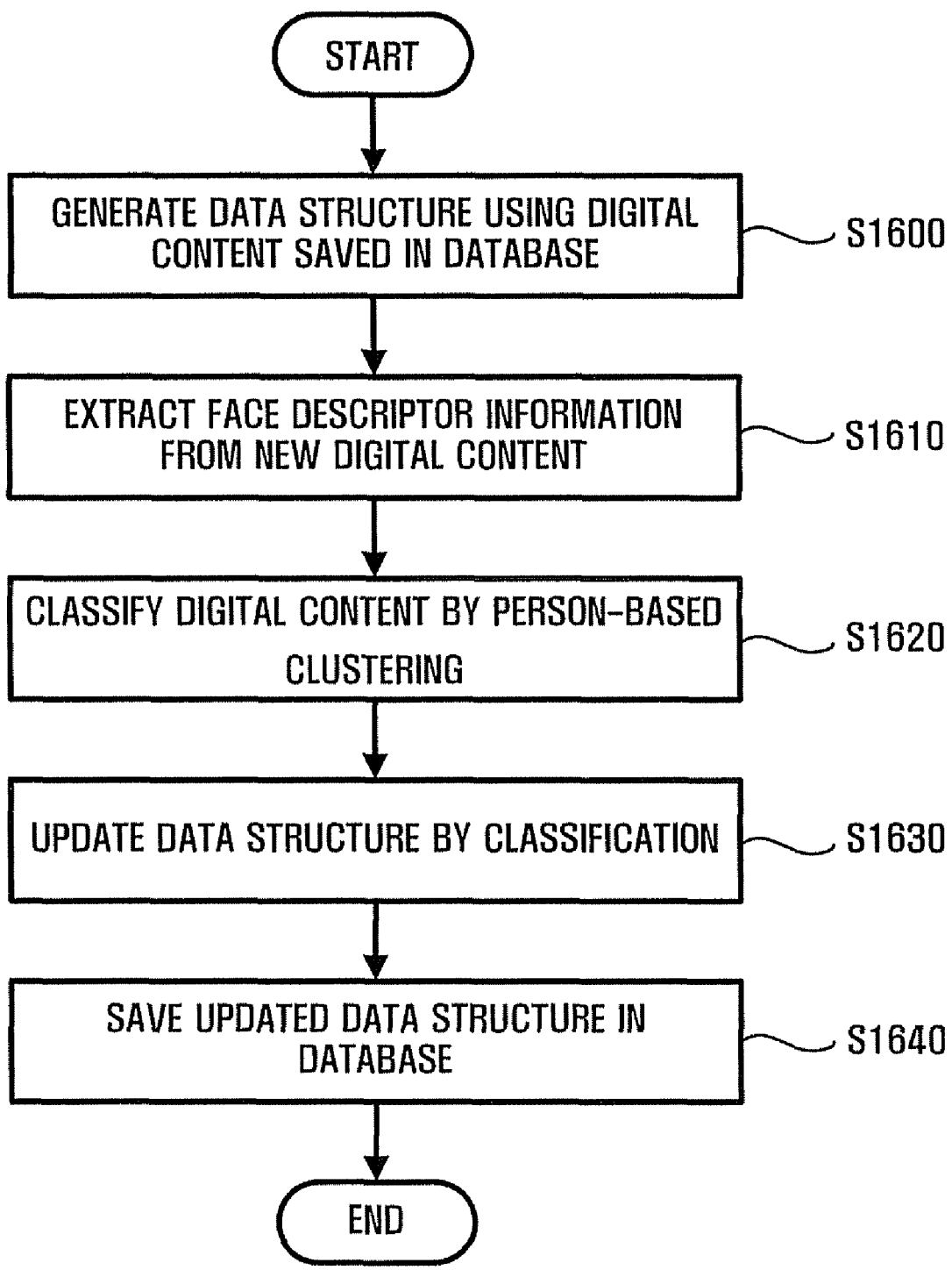
FIG. 16 is a flowchart illustrating a method of saving digital content classified by person-based clustering according to an embodiment of the present invention.

FIG. 16 shows a process of saving digital content classified by person-based clustering according to an embodiment of the present invention. Using a plurality of digital content saved in a database, a data structure in which faces are arranged by persons is generated at operation S1600. For example, the generated data structure may be a two-dimensional (2D) linked list. Using a schema saved in the database, the data structure for the plurality of digital content previously classified by person-based clustering is generated. The schema may include a content (photo) information table, a person information table, and a face information table.

A face descriptor is extracted from a face image included in new digital content to be saved in the database at operation S1610. In order to extract the face descriptor from the face image included in the new digital content, a face is extracted from the face image included in the new digital content, and feature points are extracted from the extracted face to compute the face descriptor. The face descriptor may be a feature vector.

The new digital content and the plurality of digital content saved in the database are classified by person through a cluster grouping at operation S1620. In order to determine whether the face images are within a range where the face images are considered to correspond to the same person, whether the face descriptors are located within the same cluster range is determined through comparison of distances between the face descriptors. The cluster can be generated, extended, or combined through the cluster grouping. As described above, even where new digital content is added through the cluster grouping or the existing digital content is deleted, the digital content can be classified by person-based clustering.

After the classification of the digital content by person-based clustering, the data structure can be updated by setting flags at operation S1630. For example, if the generated data structure is the 2D linked list, a flag is set to indicate that the location of the node is changed or that a node is newly added through the cluster grouping. The flag may have, for example, one value of "Added", "Modified", or "None". The generated data structure is updated according to the set flag. As the data structure is updated, a new node may be generated or the location of the existing node may be changed.

After the data structure is updated, the digital content is updated and saved in the database according to the updated data structure at operation S1640. The update and saving of the digital content in the database can be performed through the update of the schema of the database. Accordingly, using the updated schema, the saved digital content can be easily browsed and retrieved by persons.

As described above, when adding or deleting digital content, the digital content can be classified by person-based clustering, and such classification of the digital content can be efficiently reflected in the database. In addition, the classification of the digital content by person-based clustering can be automatically performed through the generation, extension, or combination of the clusters.

Figure 17:
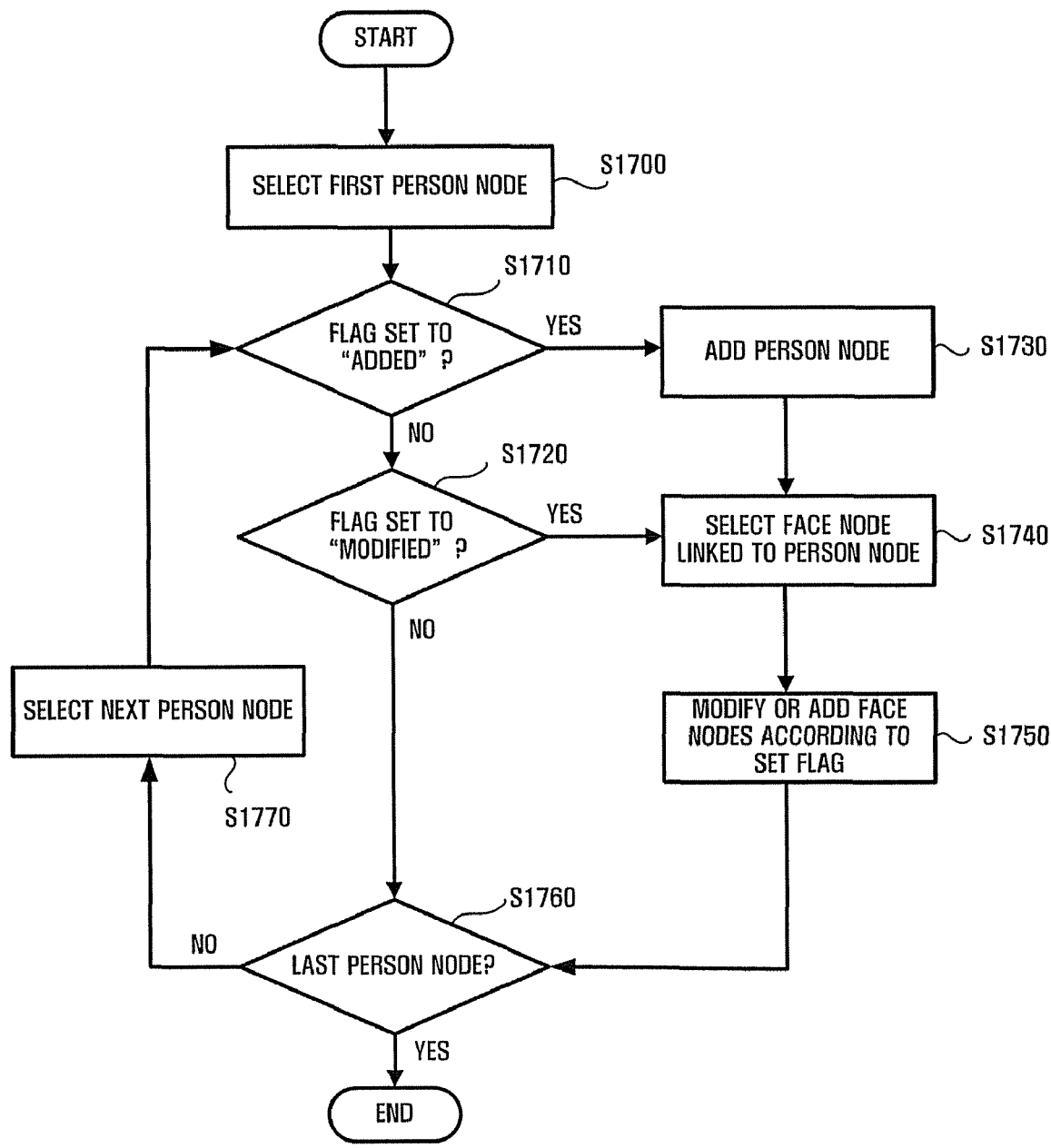
FIG. 17 is a flowchart illustrating a method of updating a data structure in a method of saving digital content classified by person-based clustering according to an embodiment of the present invention.

FIG. 17 shows a updating a data structure in a process of saving digital content classified by person-based clustering according to an embodiment of the present invention. In one example, the digital content is a photo, and a 2D linked list for linking face nodes based on person nodes as shown in FIG. 3 is generated as the data structure. However, aspects of the present invention may also be applied to other types of digital content, as discussed above.

In updating the data structure according to the flag setting, a first person node is selected from the linked list at operation S1700. Whether the flag of the first person node is set to "Added" or "Modified" is determined at operation S1710. If the flag is not set to "Added", whether the flag is set to "Modified" is determined at S1720. If the flag is not set to "Modified", whether the present person node is the last person node is determined at operation S1760. If the present person node is not the last person node, the next person node is selected at operation S1770.

If the flag is set to "Added", this indicates that a new person is registered, and thus a person node is added at operation S1730. If the flag is not set to "Added" but is set to "Modified", a face node is selected under the corresponding person node at operation S1740. The flag setting is determined as the face node is scanned, and the face node is modified or added according to the set flag at operation S1750. If the scanning of the face nodes is completed, whether the present person node is the last person node is determined at operation S1760, and if the present person node is the last person node, the update of the data structure ends.

Accordingly, in the linked list data structure, the data structure is updated according to the flag setting, and the details of the change are reflected in the database. Accordingly, the digital content saved in the database can be classified by person-based clustering and efficiently managed.

As described above, according to aspects of the present invention, in a variable environment where digital content is added or deleted, the digital content can be classified by person-based clustering, and the classified digital content can be efficiently reflected in the database. In addition, since a plurality of digital content is classified by person-based clustering in the environment where the digital content is added or deleted, a user can easily retrieve and browse the digital content. Further, since the digital content is variably classified by person-based clustering through generation, extension, or combination of clusters, the classification of the digital content by person-based clustering can be performed even without a reference image.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A system for saving digital content classified by person-based clustering, comprising:
 a database located on a non-transitory computer readable medium to save a plurality of digital content classified by person-based clustering;
 a data structure generation unit located on the non-transitory computer readable medium to generate a data structure including a plurality of nodes using the plurality of digital content;
 a face recognition unit located on the non-transitory computer readable medium to extract a face descriptor of new digital content to be saved in the database;
 a cluster classification unit located on the non-transitory computer readable medium to classify the new digital content and the plurality of digital content by the person-based clustering using the extracted face descriptor; and
 a data structure update unit located on the non-transitory computer readable medium to update the data structure according to the classification.

2. The system of claim 1, wherein the face recognition unit comprises:
 a face extraction unit to extract a face region from an image of a person in the new digital content; and
 a feature point extraction unit to extract feature points from the extracted face region.

3. The system of claim 1, wherein the face descriptor is a feature vector extracted from an image of a person in the digital content.

4. The system of claim 3, wherein the cluster classification unit classifies the new digital content and the plurality of digital content by the person-based clustering through comparison of feature vector distances using the feature vectors.

5. The system of claim 1, wherein the cluster classification unit classifies the digital content using cluster generation, cluster extension, or cluster combination.

6. The system of claim 1, wherein the data structure is a two-dimensional linked list data structure that comprises person nodes linked together by persons and face nodes linked to the person nodes to save face information of the digital content that is determined to be the same face.

7. The system of claim 1, wherein the data structure update unit updates the data structure of the new digital content and the plurality of the digital content by setting flags of person nodes and face nodes.

8. The system of claim 7, wherein the flag has a value of "Added", "Modified", or "None".

9. The system of claim 1, wherein the database saves the new digital content and the plurality of digital content according to a database schema that includes a content information table, a person information table, and a face information table.

10. The system of claim 1, wherein the database updates and saves the new digital content and the plurality of digital content by reflecting the updated data structure.

11. A system for saving digital content classified by person-based clustering, comprising:
 a data structure generation unit located on one or more processors to generate a data structure including a plurality of nodes using a plurality of digital content;
 a cluster classification unit located on the one or more processors to classify the remaining digital content by the person-based clustering using a face descriptor if a part of the plurality of digital content is deleted;
 a data structure update unit located on the one or more processors to update the data structure according to the classification; and
 a database located on the one or more processors to update and save the remaining digital content by reflecting the updated data structure.

12. The system of claim 11, wherein the data structure update unit updates the data structure of the new digital content and the plurality of the digital content by setting flags of person nodes and face nodes.

13. The system of claim 12, wherein the flag has a value of "Added", "Modified", or "None".

14. The system of claim 11, wherein the database saves the remaining digital content according to a database schema that is provided with a content information table, a person information table, and a face information table.

15. A method of saving digital content classified by person-based clustering, comprising:
 generating, on a non-transitory computer readable medium, a data structure composed of a plurality of nodes using a schema of a database that stores a plurality of digital content;
 extracting, on the non-transitory computer readable medium, a face descriptor of new digital content to be saved in the database;
 classifying, on the non-transitory computer readable medium, the new digital content and the plurality of digital content by the person-based clustering using the extracted face descriptor; and
 updating, on the non-transitory computer readable medium, the data structure according to the classification.

16. The method of claim 15, wherein the schema comprises a content information table, a person information table, and a face information table.

17. The method of claim 15, further comprising updating and saving the new digital content and the plurality of digital content in the database by reflecting the updated data structure.

18. The method of claim 15, wherein the extracting comprises:
    extracting a face region from the new digital content; and
    computing a feature vector by extracting feature points from the extracted face region;
    wherein the classifying comprises determining whether the face descriptor is within a cluster range through comparison of distances between the computed feature vector and feature vectors of faces included in the plurality of digital content using the computed feature vector.

19. The method of claim 15, wherein the classifying comprises classifying the digital content by cluster generation, cluster extension, or cluster combination.

20. The method of claim 15, wherein the updating comprises updating the data structure of the new digital content and the plurality of the digital content by setting flags of person nodes and face nodes.

21. The method of claim 20, wherein the flag has one value of "Added", "Modified", and "None".

22. A computer readable recording medium recorded with computer-readable instructions to cause a computer to execute the method of claim 15.

23. A method of saving digital content classified by person-based clustering, comprising:
    generating, on a processor, a data structure including a plurality of nodes using a plurality of digital content;
    classifying, on the processor, the remaining digital content by the person-based clustering using a face descriptor if a part of the plurality of digital content is deleted;
    updating, on the processor, the data structure according to the classification; and
    updating and saving, on the processor, the remaining digital content in a database by reflecting the updated data structure.

24. The method of claim 23, wherein the classifying comprises classifying the remaining digital content by cluster generation, cluster extension, or cluster combination.

25. The method of claim 23, wherein the updating comprises updating the data structure of the remaining digital content by setting flags of person nodes and face nodes.

26. A multimedia device to automatically and efficiently classify content stored therein, comprising:
    a storage unit located on a processor to store a plurality of digital content;
    a data structure generation unit located on the processor to generate a data structure having a plurality of nodes, based on the content stored in the storage unit;
    an extraction unit located on the processor to extract a descriptor of the new digital content to be stored in the storage unit;
    a cluster classification unit located on the processor to classify the new digital content and the plurality of digital content using a clustering scheme and the extracted descriptor; and
    a data structure update unit located on the processor to update the data structure based on the classification.

27. The multimedia device of claim 26, wherein the cluster classification reclassifies the plurality of digital content when digital content is deleted from the storage unit.

28. The multimedia device of claim 26, wherein the data structure update unit only updates changed portions of the data structure.

29. The multimedia device of claim 26, wherein the cluster classification unit classifies the new digital content through one of generating of a plurality of the clusters, extending of the plurality of the clusters, combining of the plurality of the clusters, or a combination thereof, without using a reference value.

30. The multimedia device of claim 29, wherein the reference value is a reference image.

31. The multimedia device of claim 26, wherein the cluster classification unit classifies the plurality of digital content into clusters, determines a distance between the descriptor and each of the clusters, and classifies the new digital content based on the distance.

32. The multimedia device of claim 31, wherein the cluster classification unit classifies the new digital content as part of a cluster if the descriptor is within a predetermined distance from the cluster, and classifies the new digital content as unclassified if the descriptor is not within the predetermined distance from any of the clusters.

33. The multimedia device of claim 31, wherein, if the descriptor is within a predetermined distance from one or more unclassified descriptors corresponding to one or more of the plurality of digital content, the cluster classification unit generates a new cluster including the new digital content and the one or more of the plurality of digital content corresponding to the unclassified descriptors.

34. The multimedia device of claim 31, wherein, if the descriptor is within a predetermined distance from a cluster and within a predetermined distance from one or more unclassified descriptors corresponding to one or more of the plurality of digital content, the cluster classification unit classifies the new digital content and the one or more of the plurality of digital content corresponding to the unclassified descriptors as part of the cluster.

35. The multimedia device of claim 31, wherein, if the descriptor is within a predetermined distance from two or more clusters, the cluster classification unit combines the two clusters into a single cluster and classifies the new digital content as part of the single cluster.

* * * * *